Nov. 8, 1938.    J. H. FULMER    2,135,636
APPARATUS FOR DEHYDRATING GREEN FORAGE CROPS
Filed Nov. 2, 1936    3 Sheets-Sheet 1

Inventor
J. H. Fulmer
By C. A. Snow & Co.
Attorneys.

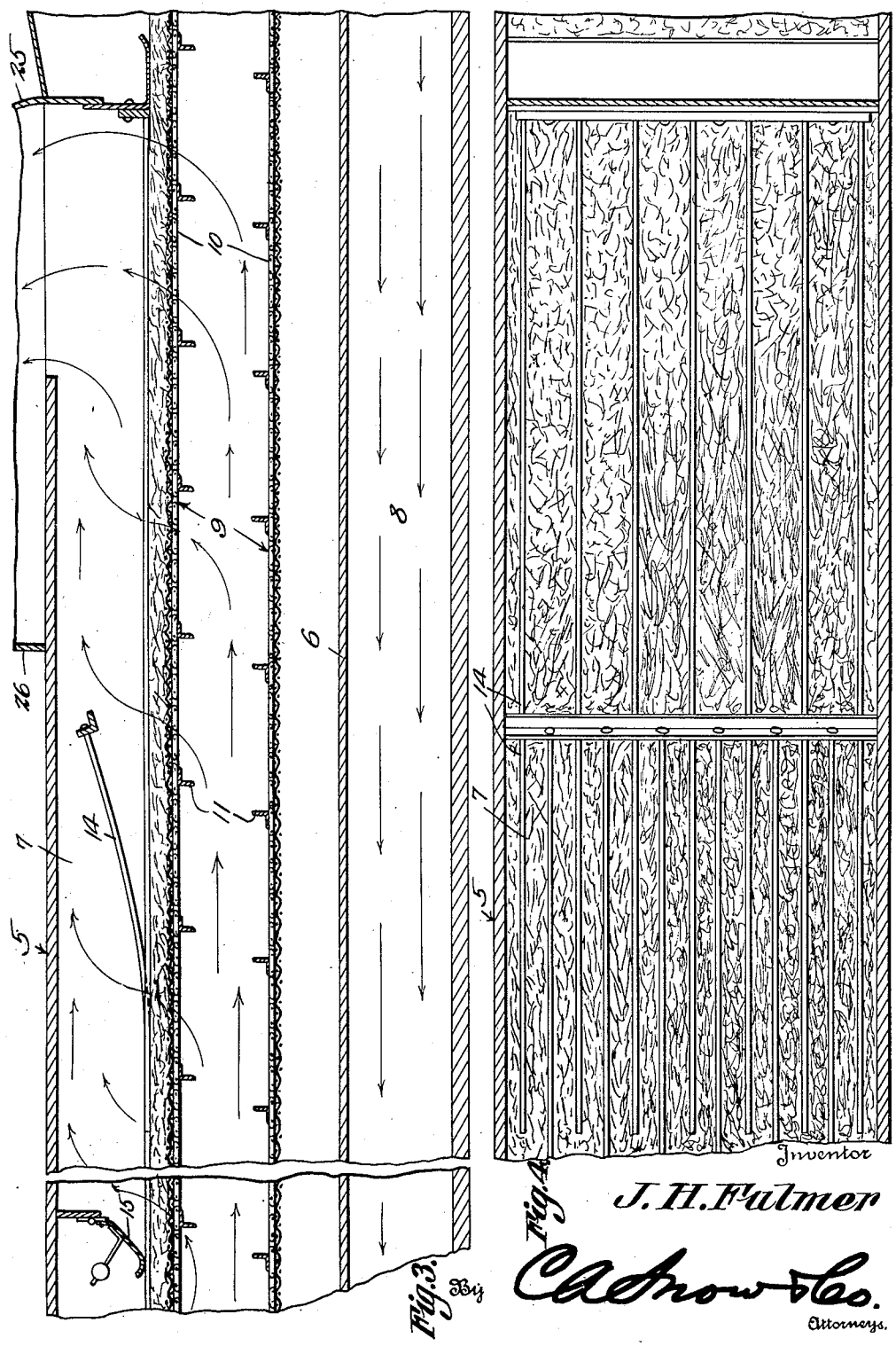

Nov. 8, 1938. J. H. FULMER 2,135,636
APPARATUS FOR DEHYDRATING GREEN FORAGE CROPS
Filed Nov. 2, 1936 3 Sheets-Sheet 3
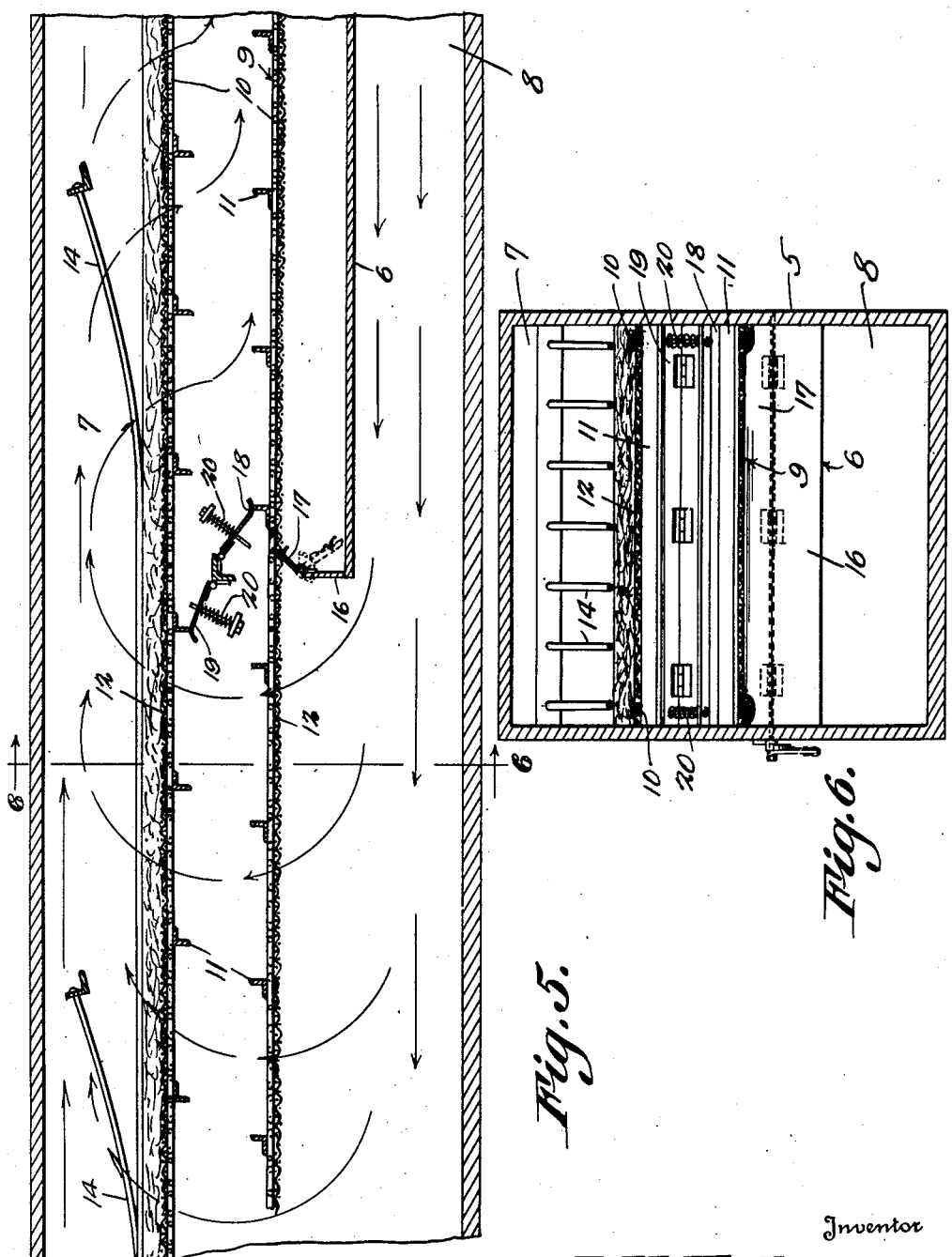
Inventor
J. H. Fulmer
By CA Snow & Co.
Attorneys.

Patented Nov. 8, 1938

2,135,636

UNITED STATES PATENT OFFICE 2,135,636

APPARATUS FOR DEHYDRATING GREEN FORAGE CROPS

Joseph H. Fulmer, Nazareth, Pa.

Application November 2, 1936, Serial No. 108,892

4 Claims. (Cl. 34—12)

This invention relates to a method and apparatus for dehydrating green forage crops in such a manner that the food values and color of the material under treatment will be preserved, to the end that an exceptionally nutritious and marketable stock food is produced.

An important object of the invention is to provide an apparatus of this character which will maintain a constant and even circulation of heated air around the material passing through the drying chamber of the apparatus, and at the same time will direct the air through the material at various points throughout the run of the endless conveyor on which the material is carried through the apparatus, to further insure the uniform drying and curing of the material.

Another object of the invention is to provide a curing chamber of a construction which will cause the heat to pass through the material for a greater length of time at the entrance end of the curing chamber, or where the moisture is greatest, with the result that the material will be freed of the larger portion of moisture at this point, thereby reducing the quantity of moisture carried through the curing chamber, during the dehydrating process.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 3 is a fragmental enlarged sectional view through the apparatus.

Figure 4 is a fragmental enlarged sectional view through the apparatus, taken at right angles to Figure 3.

Figure 5 is a fragmental enlarged sectional view through the apparatus, taken at a point near the inner end of the partition which divides the heating chamber into upper and lower compartments.

Figure 6 is a sectional view taken on line 6—6 of Figure 5.

Figure 1:
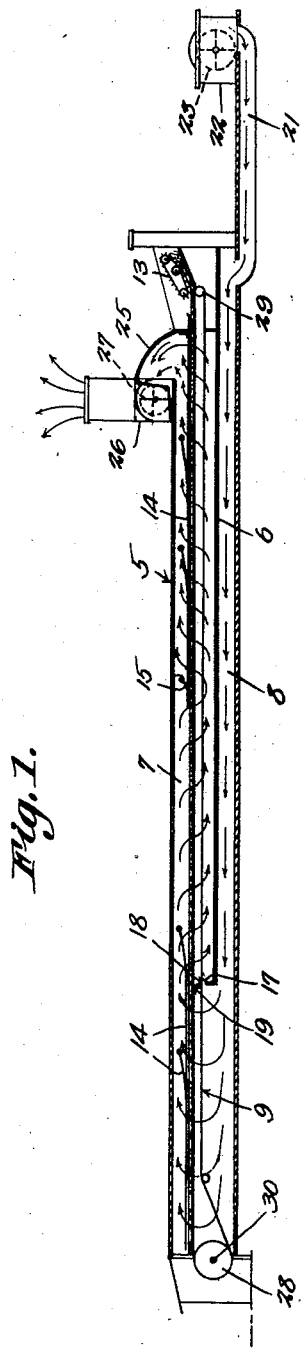
Figure 1 is a longitudinal sectional view through an apparatus constructed in accordance with the invention.
Figure 2:
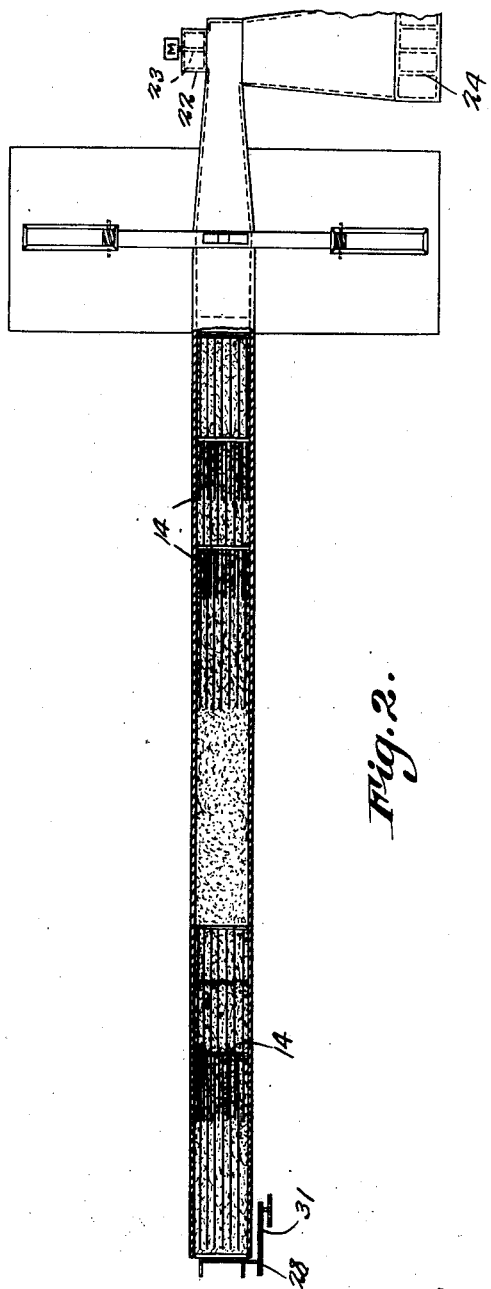
Figure 2 is a longitudinal section view taken through the apparatus at right angles to Figure 1.

Referring to the drawings in detail, the body portion of the apparatus is indicated by the reference character 5, and as shown is elongated so that the material under treatment, will be subjected to the action of the hot air, for an exceptionally long period of time.

Mounted within the body portion, is a partition 6 which extends from the front end of the body portion, to a point in spaced relation to the rear end thereof, dividing the body portion into an upper compartment 7 and a lower compartment 8, the lower compartment 8 constituting a passageway for the hot air, on its passage to the upper compartment 7, which constitutes the drying compartment of the apparatus.

Mounted within the body portion and operating directly above the partition 6, in spaced relation therewith, is an endless conveyor 9 which comprises spaced chains 10 that are connected by angle bars 11 which hold the chains in proper spaced relation with each other at all times. These chains provide a support for the foraminous material 12 on which the material under treatment is supported, while it is passing through the curing chamber or upper compartment 7. Operating at the forward end of the upper compartment or curing chamber 7, is an endless feeding member 13 which not only feeds material to the endless conveyor 9, but shapes the material into a flat ribbon-like formation of even density.

Supported within the upper compartment 7, are riders 14 which are arranged in spaced relation with each other and so constructed that they contact the upper surface of the ribbon of material passing through the apparatus, holding the ribbon in its true form, against the action of the hot air passing through the upper compartment or curing chamber 7.

Mounted within the upper compartment or curing chamber 7, is a partition 15 that extends across the upper compartment, and contacts with the inner surface thereof, the partition preventing the hot air from passing directly through the upper compartment, to the end that the hot air will be directed downwardly through the material under treatment.

As clearly shown by Figure 1 of the drawings, the inner end of the partition 6 extends upwardly at 16 and provides a support for the pivoted member 17 that engages the lower surface of the lower run of the endless conveyor 9. Disposed between the upper and lower runs of the endless conveyor, are pivoted partitioning members 18 and 19, which prevent the hot air from passing longitudinally of the body portion, between the upper and lower runs of the endless conveyor, to the end that the hot air is directed upwardly through the ribbon of forage crop under treatment, the hot air taking the path of travel indicated by the arrows in Figure 5.

In order that these pivoted partitioning members 18 and 19 will maintain the space between the upper and lower runs of the endless conveyor closed, coiled springs 20 form a part of the mountings and act to urge the partitioning members into close engagement with the endless conveyor, permitting the partitioning members to move over the angle bars, as the endless conveyor operates through the body portion.

As indicated by Figure 1 of the drawings, the partitioning members 18 and 19, are so arranged with respect to the partition 15, that the material under treatment is subjected to the action of the hot air passing through the apparatus, for an appreciable length of time, so that the greatest quantity of moisture is removed from the material at the front or feed end of the body portion.

Communicating with the lower compartment 8, at the forward end thereof, is a pipe 21 which leads from the blower casing 22, in which the blower 23 operates, the blower acting to force hot air from the furnace 24, through the lower compartment 8, where it is directed upwardly through the ribbon of forage crop under treatment, at the inner end of the partition 6.

The outlet for the hot air is at the forward end of the body portion and discharges air through the pipe 25, which communicates with the fan casing 26 in which the suction fan 27 operates. Thus it will be seen that due to this construction, air is forced through the body portion by the blower 23, whereupon the air is picked up and drawn towards the forward end of the body portion and exhausted through the casing 26 by the suction fan 27.

The endless conveyor operates over sprockets 28 and 29 disposed at the ends of the body portion, the sprockets 28 being secured to the shaft 30 which is operated by a power device, not shown, through the medium of the chain 31.

The operation of the device is as follows; hot air is forced through the lower compartment 8 of the body portion and passes upwardly into the upper compartment. Due to the arrangement of partitions 15, 17, 18 and 19, the hot air is directed downwardly through the ribbon of forage crop which is moving through the upper compartment of the body portion on the endless conveyor 9. As the hot air passes downwardly through the ribbon of forage crop, the suction fan draws the hot air upwardly through the material at the forward end of the body portion. It will be understood of course that the temperature of the air passing through the body portion is so regulated that the material under treatment will be thoroughly dehydrated when it passes from the body portion with the result that an exceptionally nutritious and marketable stock food is produced.

I claim:

1. An apparatus for curing green forage crops, comprising a body portion, an endless conveyor operating through the body portion, said conveyor adapted to carry material through the body portion in ribbon-like formation, means for directing a current of hot air through the body portion and upwardly through the material on the conveyor, and elongated fingers mounted within the body portion and resting directly on the material passing through the body portion holding the material against the action of the current of hot air and maintaining the material in ribbon-like formation.

2. An apparatus for curing green forage crops, comprising an elongated body portion, a horizontal partition dividing the body portion into a lower heat chamber and an upper curing chamber, an endless conveyor constructed of foraminous material, operating throughout the length of the curing chamber and on which material is carried through the body portion, one end of the partition terminating short of the end of the body portion providing communication between the chambers at one end only of the body portion, means for forcing hot air through the heat chamber and through the material on the conveyor, and means for drawing hot air through the curing chamber in a direction opposite to the direction of movement of the conveyor.

3. An apparatus for curing green forage crops, comprising an elongated body portion, a partition within the body portion, the inner end of the partition terminating short of the body portion providing a passageway whereby hot air may pass from the lower side of the body portion, to the upper side thereof, an endless conveyor constructed of foraminous material, operating through the space above the partition, means for forcing hot air through the space below the partition, discharging the hot air into the space above the partition at the inner end of the partition, means for drawing the air through the space above the partition, and means for directing the air upwardly and downwardly through the material on the conveyor, as the material passes through the conveyor.

4. An apparatus for curing green forage crops comprising an elongated body portion, a horizontal partition within the body portion and dividing the body portion into a lower heating chamber and an upper curing chamber, one end of the partition terminating short of one end of the body portion providing a passageway between the chambers, an endless conveyor constructed of foraminous material, operating through the curing chamber, means at one end of the curing chamber for feeding material to the conveyor in ribbon-like formation, means contacting with the material on the conveyor for holding the material against upward movement against the blast of hot air passing through the material, and means for drawing hot air through the curing chamber in a direction opposite to the direction of passage of the material under treatment.

JOSEPH H. FULMER.